United States Patent
Okuya et al.

(10) Patent No.: US 6,804,513 B2
(45) Date of Patent: Oct. 12, 2004

(54) NOISE MONITORING SYSTEM

(75) Inventors: Tsunehiro Okuya, Saitama (JP); Eiji Fukuda, Kanagawa (JP); Hiroyuki Yamano, Kanagawa (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 402 days.

(21) Appl. No.: 10/022,550

(22) Filed: Dec. 20, 2001

(65) Prior Publication Data

US 2002/0081979 A1 Jun. 27, 2002

(30) Foreign Application Priority Data

Dec. 20, 2000 (JP) ........................................ 2000-386830

(51) Int. Cl.[7] ............................ H04M 1/24; H04Q 7/20
(52) U.S. Cl. ...................... 455/423; 379/1; 379/32.01; 379/24; 455/424
(58) Field of Search .............................. 379/1, 21, 24, 379/22.03, 25, 27.08, 30, 32.01, 392.01, 399.01; 455/423, 424, 425

(56) References Cited

U.S. PATENT DOCUMENTS

| | | | |
|---|---|---|---|
| 4,124,895 A | | 11/1978 | Takise et al. |
| 5,319,715 A | * | 6/1994 | Nagami et al. .......... 381/71.14 |
| 5,809,152 A | * | 9/1998 | Nakamura et al. ......... 381/71.8 |
| 6,675,125 B2 | * | 1/2004 | Bizjak ........................ 702/179 |

FOREIGN PATENT DOCUMENTS

| | | |
|---|---|---|
| FR | 2715496 A | 7/1995 |
| JP | 61-1755228 A | 8/1986 |
| JP | 11-296206 | 10/1999 |
| JP | 2000-73376 | 1/2000 |
| JP | 2000009527 A | 1/2000 |
| SU | 1069129 A | 5/1967 |

* cited by examiner

*Primary Examiner*—Rexford Barnie
(74) *Attorney, Agent, or Firm*—Birch, Stewart, Kolasch & Birch, LLP

(57) ABSTRACT

A noise monitor for transmitting an actual sound (noise) when the noise level becomes higher than a regulation standard. In each noise detecting unit, the level of noise is measured through a microphone and a noise meter and input into a radio set. At the same time, an actual sound as noise is input through a microphone and a microphone amplifier into a PHS. In a noise monitoring unit, a PC communicates with the radio set in each noise detecting unit through a radio set to input the noise level measured by each noise detecting unit. The PC determines whether or not the noise level is higher than a regulation standard. If the noise level is higher than the regulation standard, the PC requests a PHS to call the PHS in the specified noise detecting unit to establish the communication between the PHS and the PHS. At this time, a maintenance worker can hear the actual sound from the PHS. Further, the actual sound is recorded by an MD recorder.

19 Claims, 4 Drawing Sheets

CONFIGURATION OF NOISE MONITORING SYSTEM ACCORDING TO A FIRST PREFERRED EMBODIMENT OF THE PRESENT INVENTION

NOISE MONITORING SYSTEM

CROSS-REFERENCE TO RELATED APPLICATIONS

The present application claims priority under 35 USC 119 to Japanese Patent Application No. 2000-386830 filed on Dec. 20, 2000 the entire contents thereof is hereby incorporated by reference.

BACKGROUND OF THE INVENTION

1. Field of the Invention

The present invention relates to a system for monitoring noise, and more particularly to a noise monitoring system capable of transmitting an actual sound of the noise when the noise level measured becomes a regulation standard.

2. Description of Background Art

One of the environmental issues deeply concerned with everyday life is the problem of noise. Noise includes various noises such as factory noise, establishment noise, construction noise, and traffic noise. Noise levels are regulated according to a regulation standard as defined in a noise regulation, for example, by the Noise Regulation Law for the preservation of living environment and the protection of health.

Accordingly, a party that has built a factory or establishment having a facility generating a considerable noise, for example, in a noise regulated area, would conventionally takes measures against the noise by periodically measuring the noise level on the boundary of a site of the factory or establishment and reducing the noise (noise level) at a noise source when the noise level becomes higher than the regulation standard. A basic measuring method for noise is defined in Japanese Industrial Standards (JIS) Z8731, for example.

In measuring the noise levels at a plurality of positions on the boundary of the factory or establishment site, a maintenance worker (managing person or measuring person) goes directly to each measuring position and then measures the noise level at each measuring position by using a noise meter (a precise noise meter complying with JISC1505) to check whether or not the noise level measured is higher than the regulation standard and to reduce the noise if the noise level measured is higher than the regulation standard. Further, the noise is recorded for later verification as required.

However, in such a measurement method wherein the maintenance worker goes to each measuring position, there is a problem that the burden on the maintenance worker becomes remarkably heavy in the case that the measuring position is located at a distant place or in the case that many measuring positions are located.

In such cases, the following system is utilized. A noise meter having a communication function is located at each measuring position, and a control center or the like communicates with each noise meter to obtain a noise level measured by each noise meter. When this noise level becomes higher than the regulation standard, a warning sound is generated, for example, to inform the maintenance worker of this condition.

In this system, however, the maintenance worker can hear the warning sound, but cannot hear the actual sound as the noise. That is, the maintenance worker cannot identify the noise. To identify the noise, the maintenance worker must go directly to the measuring position, so that there is a great burden on the maintenance worker. Further, a long time period is required until the noise is identified, so that any countermeasures against the noise cannot be immediately examined.

Further, some noise source generates a noise whose level temporarily exceeds the regulation standard. In this case, although the maintenance worker hears the warning sound and goes to the measuring position, the noise from such a noise source does not always continue to be generated, and the noise cannot yet be identified. Accordingly, the noise cannot be recorded for later verification.

SUMMARY AND OBJECTS OF THE INVENTION

It is accordingly an object of the present invention to provide a noise monitoring system which can transmit an actual sound (noise) when the noise level becomes higher than a regulation standard, thereby identifying the noise.

In accordance with an aspect of the present invention, there is provided a noise monitoring system including at least one noise detecting unit and a noise monitoring unit adapted to communicate with the noise detecting unit. The noise detecting unit includes a measuring device for measuring a noise level of an actual sound. A noise level transmitting device is provided for transmitting the noise level measured by the measuring device to the noise monitoring unit. An actual sound transmitting device is provided for transmitting the actual sound according to a request from the noise monitoring unit. The noise monitoring unit includes determining device for analyzing the noise level transmitted by the noise level transmitting device of the noise detecting unit and determining whether or not the noise level is higher than a regulation standard. A device is provided for requesting the noise detecting unit to transmit the actual sound when the determining device determines that the noise level is higher than the regulation standard. A sound generating device is provided for generating the actual sound transmitted by the actual sound transmitting device of the noise detecting unit.

With this arrangement, when the noise level becomes higher than the regulation standard, the actual sound as the noise is transmitted by the actual sound transmitting device, and the transmitted actual sound is generated by the actual sound generating device such as a telephone receiver or a speaker. Accordingly, a maintenance worker need not go to the measuring position and can immediately identify the noise.

Preferably, the noise monitoring unit further includes a recording device for recording the actual sound transmitted by the actual sound transmitting device of the noise detecting unit.

With this arrangement, when the noise level at the measuring position becomes higher than the regulation standard, the actual sound of the noise can be recorded by the recording device.

Preferably, the noise detecting unit further includes a backup power supply.

With this arrangement, even in the case where the measuring position is set at a position where the power for operating each noise detecting unit cannot be supplied or in the case that the power supply to each noise detecting unit is stopped because of a power failure or the like, the power can be supplied from the backup power supply to each noise detecting unit.

Preferably, the noise detecting unit further includes a moving device for making the noise detecting unit movable in a given area.

With this arrangement, each noise detecting unit can be easily moved.

In accordance with another aspect of the present invention, there is provided a noise monitoring system including at least one noise detecting unit and a noise monitoring unit adapted to communicate with the noise detecting unit. The noise detecting unit includes a measuring device for measuring a noise level of an actual sound. A noise level transmitting device is provided for transmitting the noise level measured by the measuring device to the noise monitoring unit. An actual sound transmitting device is provided for transmitting the actual sound according to a request from the noise monitoring unit. The noise monitoring unit includes a determining device for analyzing the noise level transmitted by the noise level transmitting device of the noise detecting unit and determining whether or not the noise level is higher than a regulation standard. An information sending device is provided for sending at least information that the noise level is higher than the regulation standard and information on the noise detecting unit that has detected the noise level higher than the regulation standard when the determining device determines that the noise level is higher than the regulation standard. The noise monitoring system further includes a device for requesting the noise detecting unit to transmit the actual sound. A sound generating device is provided for generating the actual sound transmitted by the actual sound transmitting device of the noise detecting unit. A recording device is provided for recording the actual sound transmitted by the actual sound transmitting device of the noise detecting unit.

With this arrangement, when the information sending device in the noise monitoring unit sends at least the information that the noise level is higher than the regulation standard and the information on any one of the noise detecting units that has detected the noise level higher than the regulation standard, the device (e.g., PHS) for requesting the specified noise detecting unit to transmit the actual sound calls the actual sound transmitting device (e.g., PHS) in the specified noise detecting unit to establish the communication between these device. Accordingly, the maintenance worker can hear the actual sound as the noise from the requesting device. Further, the actual sound can be recorded by the recording device such as an MD recorder.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
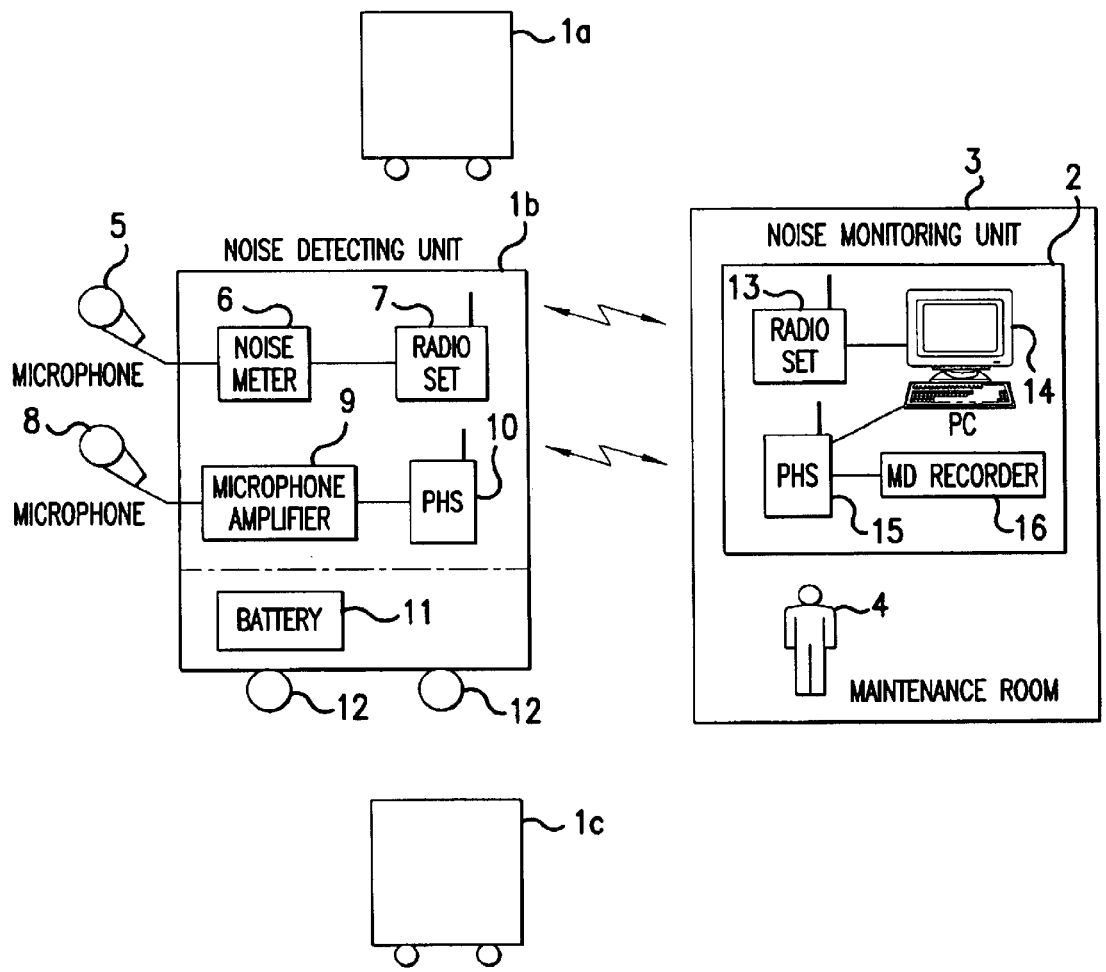
FIG. 1 is a schematic diagram showing a noise monitoring system according to a first preferred embodiment of the present invention.

Some preferred embodiments of the present invention will now be described with reference to the drawings. FIG. 1 is a schematic diagram showing a noise monitoring system according to a first preferred embodiment of the present invention, wherein this system is applied to a site such as a factory or establishment. This noise monitoring system is composed of a plurality of noise detecting units 1 (1a, 1b, and 1c) and a noise monitoring unit 2. The noise detecting units 1a, 1b, 1c, . . . are provided at a plurality of measuring positions on the boundary of the site, and the noise monitoring unit 2 is provided in a maintenance room 3 for managing noises measured at these measuring positions. A maintenance worker 4 is on standby in the maintenance room 3 in case of an emergency. While the three noise detecting units 1a, 1b, and 1c are shown for convenience of illustration, more than three noise detecting units 1a, 1b, 1c, . . . are actually provided at a plurality of measuring positions on the boundary of the site. These noise detecting units 1a, 1b, 1c, . . . have the same configuration.

Each noise detecting unit 1a, 1b, 1c, . . . is composed generally of a data handling unit and an actual sound handling unit. The data handling unit includes a microphone 5, a noise meter 6 and a radio set 7. The microphone 5 and the noise meter 6 are electrically connected with each other and the noise meter 6 and the radio set 7 are electrically connected with each other, wherein a signal (data) is transmitted from the microphone 5 through the noise meter 6 to the radio set 7. On the other hand, the actual sound handling unit includes a microphone 8, a microphone amplifier 9, and a PHS (Personal Handyphone System) 10. The microphone 8 and the microphone amplifier 9 are electrically connected with each other, and the microphone amplifier 9 and the PHS 10 are electrically connected with each other, whereby a signal is transmitted from the microphone 8 through the microphone amplifier 9 to the PHS 10.

The microphone 5 is a microphone for detecting noise. The noise meter 6 is an instrument for measuring a noise level of the noise detected by the microphone 5. The microphone 5 and the noise meter 6 conform to the Noise Regulation Law, for example, to measure a proper noise level.

The radio set 7 is a device for performing radio communication with the noise monitoring unit 2. This device is configured so that the radio communication with the noise monitoring unit 2 is performed directly or through another adjacent radio set 7. Such radio communication may be realized by a radio communication network system described in Japanese Patent Laid-open No. 2000-013376, for example.

The microphone 8 is a microphone for detecting an actual sound as noise. The microphone amplifier 9 is an amplifier for amplifying the actual sound detected by the microphone 8. It is sufficient that the microphone 8 and the microphone amplifier 9 have at least a level of performance such that the actual sound can be identified. Accordingly, the microphone 8 and the microphone amplifier 9 may be provided by inexpensive devices having such a level of performance.

The PHS 10 is a simplified portable telephone, and it is used to transmit the actual sound as the noise amplified by the microphone amplifier 9 to the maintenance room 3 in this preferred embodiment. The PHS 10 has an automated call incoming function such that when receiving a call from the outside, the PHS 10 is automatically brought into a condition where communication with a calling party is allowed.

Each noise detecting unit 1a, 1b, 1c, . . . further includes a removable battery (backup power supply) 11. The battery 11 is provided for the purpose of supplying power in the case of measuring noise at a position where the external power supply cannot be received or in the case of a power failure, thereby maintaining the function of the noise detecting unit 1. The switching from the external power supply to the battery 11 may be manually carried out. Alternatively, the noise detecting unit 1a, 1b, 1c, . . . may be provided with device for monitoring a voltage of the external power supply and automatically switching the external power supply to the battery 11 when the voltage monitored becomes a given value or less. Further, while the battery 11 is provided inside the noise detecting unit 1a, 1b, 1c, . . . as shown, the battery 11 may be provided outside the noise detecting unit 1. In this case, the battery 11 is provided at its bottom with wheels for easy transportation, whereby the battery 11 can be easily transported to the noise detecting unit 1a, 1b, 1c, . . . as required to supply the battery power to the noise detecting unit 1.

Further, each noise detecting unit 1a, 1b, 1c, . . . is provided at its bottom with small wheels 12, so that the unit 1a, 1b, 1c, . . . can be easily moved to another measuring position by manually pulling or pushing the unit 1. Alternatively, a motive power source such as a motor for moving the unit 1a, 1b, 1c, . . . may be mounted on the unit 1.

On the other hand, the noise monitoring unit 2 includes a radio set 13, a personal computer (which will be hereinafter referred to simply as PC) 14, a PHS 15, and an MD (Mini Disk) recorder 16. The radio set 13 and the PC 14 are electrically connected with each other, the PC 14 and the PHS 15 are electrically connected with each other, and the PHS 15 and the MD recorder 16 are electrically connected with each other, whereby the exchange of signals is performed among these components 13, 14, 15, and 16 as required.

The radio set 13 has the same configuration as that of the radio set 7. The radio set 13 communicates with the radio set 7 of each noise detecting unit 1a, 1b, 1c, . . . according to a communication request from the PC 14, and receives a noise level measured in each noise detecting unit 1.

The PC 14 has a data logger function, for example, to perform various kinds of data processing. For example, the PC 14 analyzes the noise level received by the radio set 13 for each noise detecting unit 1a, 1b, 1c, . . . and determines whether or not the noise level is higher than a regulation standard. Further, the PC 14 controls to specify any of the radio sets 7 in the noise detecting units 1a, 1b, 1c, . . . for communication with the radio set 13, and communicates with the PHS 15 to request the PHS 15 to call the PHS 10 in a specified one of the noise detecting units 1. While the communication between the PC 14 and the PHS 15 is provided by cable communication as shown, this communication may be provided by radio communication or combined cable and radio communication. For example, another PHS may be connected by a cable to the PC 14 to perform cable communication between the PC 14 and this PHS and to perform radio communication between this PHS and the PHS 15, thus performing combined cable and radio communication between the PC 14 and the PHS 15.

The PHS 15 calls the PHS 10 in the specified noise detecting unit 1a, 1b, 1c, . . . according to the request from the PC 14 to thereby establish the communication with the PHS 10. At this time, the maintenance worker 4 can hear the actual sound as noise transmitted from the PHS 10 in service, by using the PHS 15 serving also as a sound generating device. Accordingly, although the measuring position is far from the maintenance room 3, the maintenance worker 4 does not need to go to the measuring position and can identify the noise. Further, the PHS 15 may be replaced by a standard telephone.

The MD recorder 16 records on an MD the actual sound as the noise transmitted from the PHS 10 to the PHS 15. The recording on the MD is automatically started when the communication between the PHS 10 and the PHS 15 is established. However, whether or not the recording on the MD is to be automatically started may be preliminarily set by the maintenance worker 4. Further, the maintenance worker 4 may manually start the recording on the MD as required.

The operation of the noise monitoring system according to the first preferred embodiment will now be described.

In each noise detecting unit 1, a noise level is always measured by the microphone 5 and the noise meter 6, and the noise level measured is input into the radio set 7. The radio set 7 communicates with the radio set 13 in the noise monitoring unit 2 with a given period or when receiving a communication request from the noise monitoring unit 2, and then transmits the input noise level to the radio set 13 in the noise monitoring unit 2.

At the same time, the actual sound as the noise is input through the microphone 8 and the microphone amplifier 9 to the PHS 10. When a call from the PHS 15 in the noise monitoring unit 2 is made, the PHS 10 automatically receives the call by its automated call incoming function to establish the communication with the PHS 15 and transmit the actual sound to the PHS 15.

The measurement of the noise level is performed by a method conforming to the Noise Regulation Law, e.g., a method defined by JISZ8731.

On the other hand, the PC 14 in the noise monitoring unit 2 communicates with the radio set 7 in each noise detecting unit 1a, 1b, 1c, . . . through the radio set 13 with a given period to input the noise level measured in each noise detecting unit 1. Alternatively, the PC 14 may communicate with the radio set 7 in a specified one of the noise detecting units 1a, 1b, 1c, . . . as required to input the noise level measured in this specified noise detecting unit 1. The PC 14 then determines whether or not the noise level measured at each measuring position continues to be higher than a regulation value (regulation value of the noise level), i.e., a regulation standard for a given period of time. The regulation standard is a value that can be arbitrarily set by the maintenance worker 4, for example. For example, when the noise level continues to be higher than 60 dB in the morning or in the evening, 65 dB in the daytime, or 50 dB in the nighttime for 10 minutes, the PC 14 determines that the noise level is higher than the regulation standard. We note that there is a difference in time somewhat between regions, the morning is defined as the time from 6:00 to 8:00, the daytime is defined as the time from 8:00 to 19:00, the evening is defined as the time from 19:00 to 22:00, and the nighttime is defined as the time from 22:00 to 6:00.

When it is determined that the noise level input from the specified noise detecting unit 1a, 1b, 1c, . . . is higher than the regulation standard, the PC 14 requests the PHS 15 to call the PHS 10 provided in the specified noise detecting unit 1. As a result, the PHS 15 actually makes a call to the PHS 10 in the specified noise detecting unit 1.

Then, the called PHS 10 automatically receives this call by its automated call incoming function to establish communication with the PHS 15. In this communication established condition, the actual sound as the noise input through the microphone 8 and the microphone amplifier 9 to the PHS 10 is transmitted from the PHS 10 to the PHS 15.

Accordingly, the maintenance worker 4 can hear the actual sound as noise by using the PHS 15. Unlike the prior art, the maintenance worker 4 need not go to the measuring position where the specified noise detecting unit is provided, and can immediately identify the actual sound as the noise by using the PHS 15. Further, since the maintenance worker 4 need not go to the measuring position, the maintenance worker 4 can immediately examine countermeasures against the noise in the maintenance room 3.

When the communication between the PHS 15 and the PHS 10 is established, the MD recorder 16 automatically starts recording on the MD the actual sound as the noise transmitted to the PHS 15. With this arrangement, the actual sound as the noise whose level is higher than the regulation standard can be recorded on the MD, and the noise recorded can be examined later by repeatedly reproducing the actual sound. Further, even when the maintenance worker 4 is absent in the maintenance room 3, there is no possibility of missing of the actual sound because it is recorded on the MD by the MD recorder 16.

The noise monitoring system according to this preferred embodiment can be configured easily at a low cost, because the microphone 8, the microphone amplifier 9, the PHS 10, the PHS 15, and the MD recorder 16 are each commercially available at a low cost and are used to configure device for transmitting the actual sound as the noise detected and recording the actual sound transmitted.

While the PHS 15 calls the PHS 10 in the specified noise detecting unit 1a, 1b, 1c, . . . according to the request from the PC 14 in the above preferred embodiment, the maintenance worker 4 may directly operate the PHS 15 to call the PHS 10 in the specified noise detecting unit 1. Further, the maintenance worker 4 may manually operate the MD recorder 16 to record the actual sound on the MD.

A second preferred embodiment of the present invention will now be described.

Figure 2:
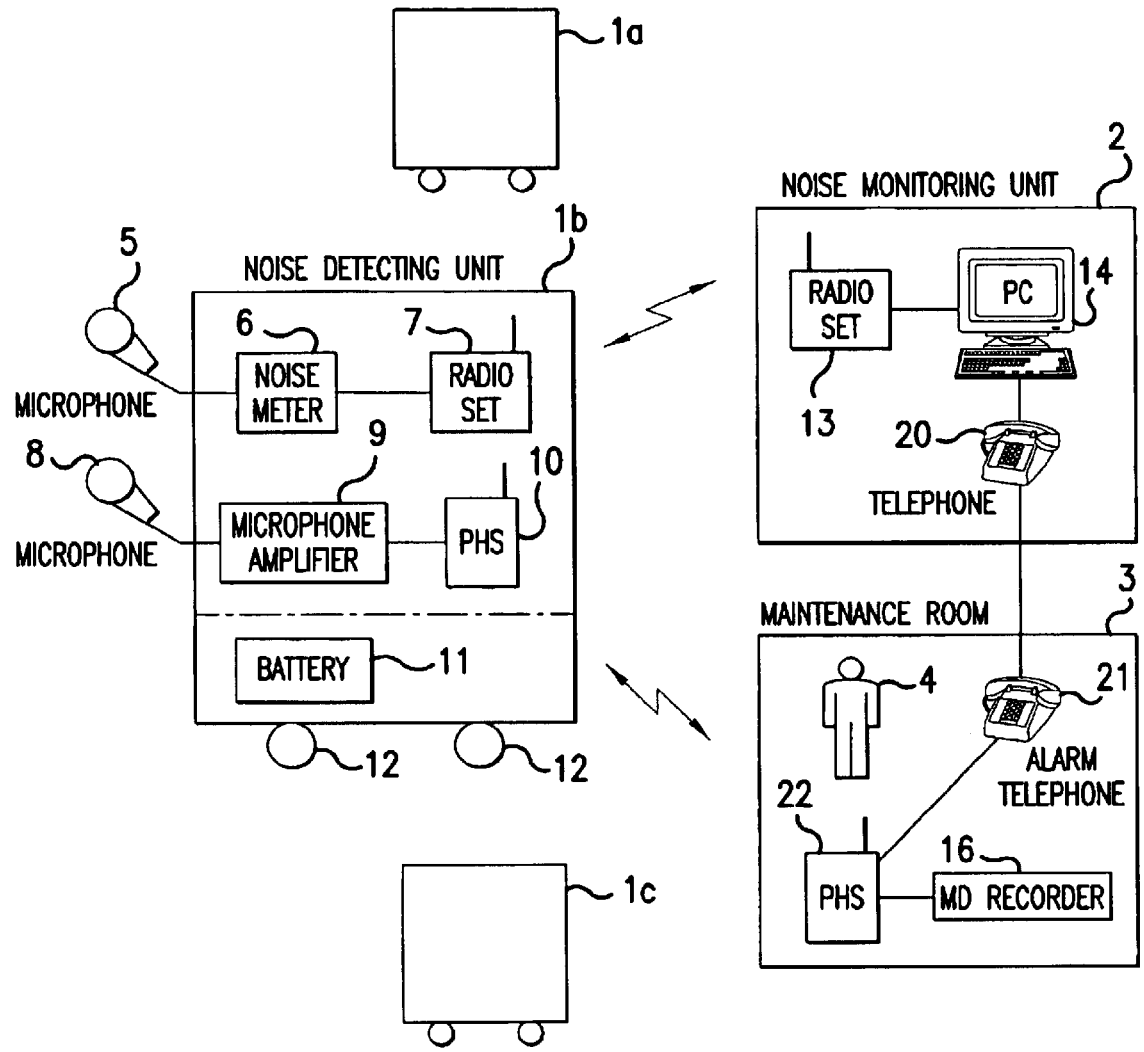
FIG. 2 is a schematic diagram showing a noise monitoring system according to a second preferred embodiment of the present invention.

FIG. 2 is a schematic diagram showing a noise monitoring system according to a second preferred embodiment of the present invention. The second preferred embodiment is different from the first preferred embodiment in the flow of processing after determining that the noise level is higher than the regulation standard. In the second preferred embodiment, the same parts as those in the first preferred embodiment are denoted by the same reference numerals.

The noise monitoring system according to the second preferred embodiment includes a plurality of noise detecting units 1, a noise monitoring unit 2, and a maintenance room 3. Each noise detecting unit 1a, 1b, 1c, . . . has the same configuration as that of each noise detecting unit 1a, 1b, 1c, . . . in the first preferred embodiment, so the description thereof will be omitted herein.

The noise monitoring unit 2 is not provided inside the maintenance room 3, but it is provided outside the maintenance room 3, e.g., in a monitor room. In the noise monitoring unit 2, a telephone 20 is connected to a PC 14. The telephone 20 makes a call to a given communication point according to a request from the PC 14 to establish communication. When the PC 14 determines that the noise level is higher than the regulation standard, the PC 14 requests the telephone 20 to call an alarm telephone 21 provided in the maintenance room 3 and thereby to establish communication between the telephone 20 and the alarm telephone 21. In this communication established condition, the PC 14 sends the information on the specified noise detecting unit 1a, 1b, 1c, . . . that has detected the noise level higher than the regulation standard, through the telephone 20 to the alarm telephone 21. This information includes at least the telephone number of the PHS 10 in the specified noise detecting unit 1a, 1b, 1c, . . . and the facility name of the specified noise detecting unit 1. This information may include only the telephone number of the facility name.

In this preferred embodiment, an MD recorder 16 is provided in the maintenance room 3 rather than in the noise monitoring unit 2.

Maintenance worker 4 is on standby in the maintenance room 3, and the alarm telephone 21 for receiving a call from the telephone 20 in the noise monitoring unit 2 is provided in the maintenance room 3. The alarm telephone 21 is electrically connected to a PHS 22 in the maintenance room 3. When the communication between the telephone 20 and the alarm telephone 21 is established, the information sent from the telephone 20 to the alarm telephone 21 is transferred from the alarm telephone 21 to the PHS 22 without any changes. When receiving the information, the PHS 22 calls the PHS 10 in the specified noise detecting unit 1a, 1b, 1c, . . . according to the telephone number of the PHS 10 included in the information received, thereby establishing the communication between the PHS 22 and the PHS 10. The PHS 22 is also electrically connected to an MD recorder 16 provided in the maintenance room 3. The MD recorder 16 records the actual sound detected by the specified noise detecting unit 1a, 1b, 1c, . . . and transmitted from the PHS 10 to the PHS 22. The recording of the actual sound is automatically started when the communication between the PHS 22 and the PHS 10 in the specified noise detecting unit 1a, 1b, 1c, . . . is established. However, whether or not the recording is to be automatically started may be preliminarily set.

The operation of the noise monitoring system according to the second preferred embodiment will now be described. Like the first preferred embodiment, the PC 14 in the noise monitoring unit 2 inputs a noise level measured in each noise detecting unit 1, and determines whether or not the noise level measured is higher than the regulation standard. When it is determined that the noise level measured in any one of the noise detecting units 1a, 1b, 1c, . . . is higher than the regulation standard, the PC 14 requests the telephone 20 to call the alarm telephone 21 in the maintenance room 3. Then, the telephone 20 actually calls the alarm telephone 21 according to the request from the PC 14. When the communication between the telephone 20 and the alarm telephone 21 is established, the PC 14 sends through the telephone 20 to the alarm telephone 21 the information that the noise level is higher than the regulation standard and the information on the specified noise detecting unit that has detected the noise level higher than the regulation standard. More specifically, the PC 14 sends at least the telephone number of the PHS 10 in the specified noise detecting unit 1a, 1b, 1c, . . . and the facility name of the specified noise detecting unit 1a, 1b, 1c, . . . through the telephone 20 to the alarm telephone 21. The information sent to the alarm telephone 21 is transferred to the PHS 22. Then, the PHS 22 calls the PHS 10 in the specified noise detecting unit 1a, 1b, 1c, . . . according to the telephone number of the PHS 10, thus establishing the communication between the PHS 22 and the PHS 10.

Alternatively, the maintenance worker 4 in the maintenance room 3 may receive the information through the alarm telephone 21 and directly operate the PHS 22 to call the PHS 10 in the specified noise detecting unit 1, thereby establishing the communication between the PHS 22 and the PHS 10.

When the communication between the PHS 22 and the PHS 10 is established, the actual sound as the noise input through the microphone 8 and the microphone amplifier 9 into the PHS 10 is transmitted to the PHS 22, and the maintenance worker 4 can hear the actual sound by using the PHS 22. Further, at the same time, the actual sound transmitted to the PHS 22 is automatically recorded by the MD recorder 16. Whether or not the actual sound is to be automatically recorded may be preliminarily set. In this case, the following modes are considered. The first mode is that the maintenance worker 4 hears the actual sound from the PHS 22 and the actual sound is not recorded on the MD. The second mode is that the maintenance worker 4 hears the actual sound from the PHS 22 and the actual sound is automatically recorded on the MD. The third mode is that the maintenance worker 4 does not hear the actual sound from the PHS 22 and the actual sound is automatically recorded on the MD. Alternatively, the maintenance worker 4 may manually operate the MD recorder 16 as required to start the recording.

According to the second preferred embodiment, the maintenance worker 4 need not go to the measuring position where the specified noise detecting unit 1a, 1b, 1c, ... is provided, and can immediately identify the actual sound as the noise by using the PHS 22. Further, the maintenance worker 4 can immediately examine countermeasures against the noise in the maintenance room 3. The noise detected can be recorded on the MD, and the actual sound as noise thus recorded can therefore be examined later by repeatedly reproducing the actual sound. Further, even when the maintenance worker 4 is absent in the maintenance room 3, there is no possibility of missing of the actual sound because it is recorded on the MD by the MD recorder 16. In addition, device for transmitting the actual sound detected and recording the actual sound transmitted is configured by using the microphone 8, the microphone amplifier 9, the PHS 10, the PHS 22, and the MD recorder 16 each commercially available at a low cost, so that the noise monitoring system according to the second preferred embodiment can be configured easily at a low cost.

Figure 3:
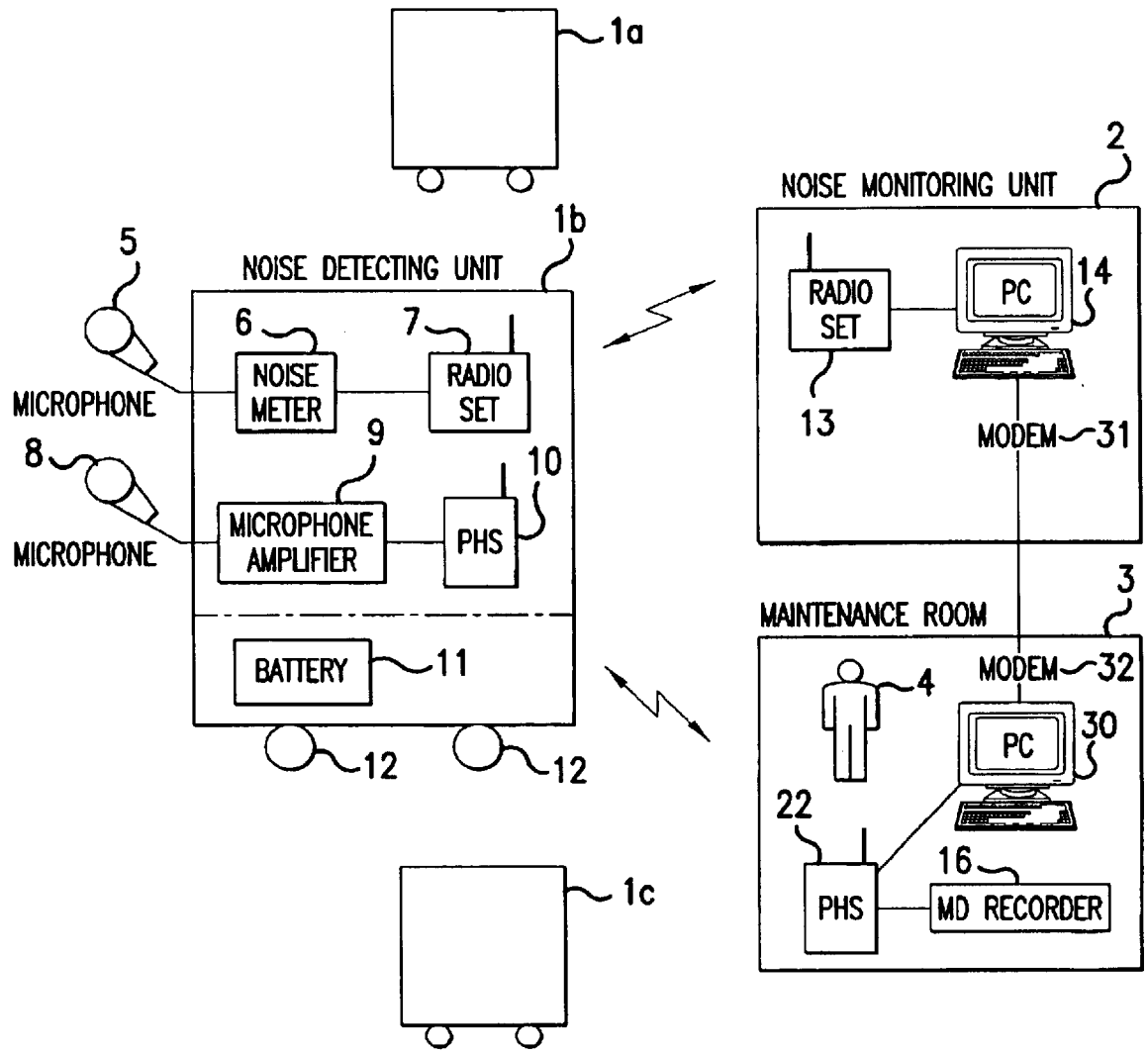
FIG. 3 is a schematic diagram showing a noise monitoring system according to a modification of the second preferred embodiment of the present invention.

In this preferred embodiment, the configuration including the telephone 20 and the alarm telephone 21 may be modified. FIG. 3 is a schematic diagram showing such a modification of the noise monitoring system according to the second preferred embodiment. The modification shown in FIG. 3 is configured by eliminating the telephone 20 in the noise monitoring unit 2 shown in FIG. 2, providing a PC 30 in place of the alarm telephone 21 in the maintenance room 3 shown in FIG. 2, and connecting the PC 14 and the PC 30 through modems 31 and 32. The other configuration is the same as that shown in FIG. 2, so the description thereof will be omitted herein.

When the PC 14 determines that the noise level input from the specified noise detecting unit 1a, 1b, 1c, ... is higher than the regulation standard, the PC 14 communicates with the PC 30 to send the information including at least the telephone number of the PHS 10 in the specified noise detecting unit 1a, 1b, 1c, ... and the facility name of the specified noise detecting unit 1a, 1b, 1c, ... to the PC 30. Then, the PC 30 sends the telephone number of the PHS 10 in the specified noise detecting unit 1a, 1b, 1c, ... to the PHS 22. Then, the PHS 22 calls the PHS 10 in the specified noise detecting unit 1a, 1b, 1c, ... according to the telephone number received from the PC 30. The subsequent processing is similar to that described with reference to FIG. 2.

According to this modification, an effect similar to the effect described above with reference to FIG. 2 can be obtained.

While the communication between the PC 14 and the PC 30 is provided by cable communication through the modems 31 and 32 in the above modification, this communication may be provided by any other communication networks such as LAN (Local Area Network), WAN (Wide Area Network), internet, radio network, and combined radio and cable network. Further, the communication between the PC 30 and the PHS 22 may also be provided by radio network or combined radio and cable network.

A third preferred embodiment of the present invention will now be described.

Figure 4:
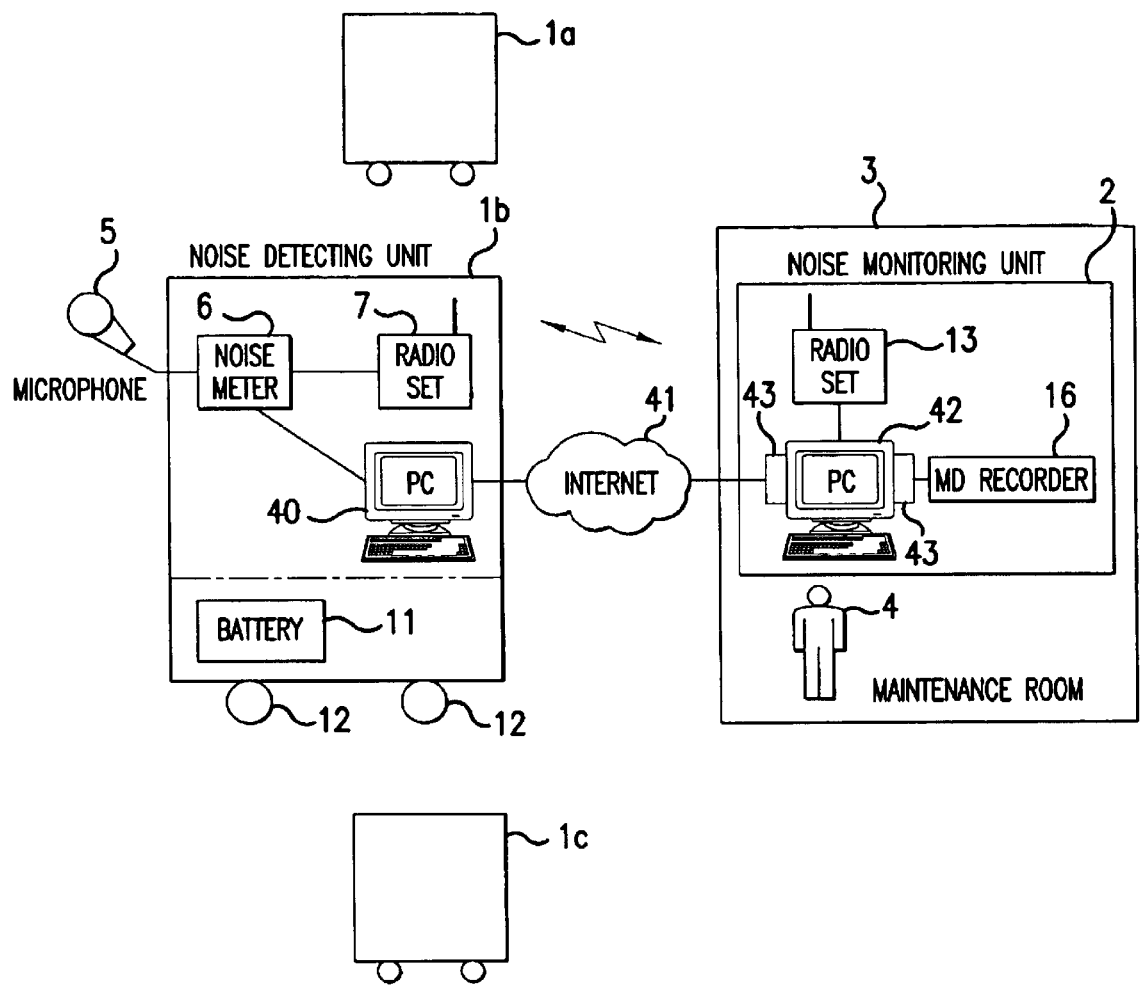
FIG. 4 is a schematic diagram showing a noise monitoring system according to a third preferred embodiment of the present invention.

FIG. 4 is a schematic diagram showing a noise monitoring system according to a third preferred embodiment of the present invention. This preferred embodiment is different from the first preferred embodiment in the configuration for transmitting the actual sound as the noise. In this preferred embodiment, the same parts as those of the first preferred embodiment are denoted by the same reference numerals.

Each noise detecting unit 1a, 1b, 1c, ... in the third preferred embodiment has a data handling unit similar to that in the first preferred embodiment and an actual sound handling unit different from that in the first preferred embodiment. The actual sound handling unit in the third preferred embodiment includes a microphone 5, a noise meter 6, and a PC 40. The noise meter 6 and the PC 40 are electrically connected with each other, so that the actual sound (analog signal) as the noise detected by the microphone 5 is input through the noise meter 6 into the PC 40. The PC 40 is also connected to an internet 41.

The noise monitoring unit 2 in the third preferred embodiment includes a PC 42 having a pair of speakers 43, and an MD recorder 16 electrically connected to the PC 42. The PC 42 is also connected to the internet 41.

Accordingly, the PC 40 in each noise detecting unit 1a, 1b, 1c, ... and the PC 42 in the noise monitoring unit 2 can communicate with each other through the internet 41.

The operation of the noise monitoring system according to the third preferred embodiment will now be described. In each noise detecting unit 1, a noise level is measured by the data handling unit as in the first preferred embodiment, and an actual sound (analog signal) as the noise detected by the microphone 5 is input through the noise meter 6 into the PC 40. The PC 40 converts the input actual sound (analog signal) into a digital signal, and transmits (outputs) the actual sound (digital signal) through the internet 41 to the PC 42 in the noise monitoring unit 2 according to a communication request from the PC 42.

On the other hand, the PC 42 in the noise monitoring unit 2 inputs the noise level measured in each noise detecting unit 1a, 1b, 1c, ... and determines whether or not the noise level input is higher than the regulation standard similar to the first preferred embodiment. When the PC 42 determines that the noise level input from any one of the noise detecting units 1a, 1b, 1c, ... is higher than the regulation standard, the PC 42 communicates with the PC 40 in the specified noise detecting unit 1a, 1b, 1c, ... through the internet 41 to request the PC 40 to transmit the actual sound (digital signal) as noise to the PC 42.

When the PC 40 in the specified noise detecting unit 1a, 1b, 1c, ... receives the communication request from the PC 42, the PC 40 transmits the input actual sound (digital signal) through the internet 41 to the PC 42 in the noise monitoring unit 2. Alternatively, the PC 40 may continuously transmit the actual sound (digital signal) as noise through the internet 41 to the PC 42 irrespective of the communication request from the PC 42.

The PC 42 receives the actual sound (digital signal) as the noise transmitted from the PC 40, and outputs it from the speakers 43. Accordingly, the maintenance worker 4 can hear the actual sound as noise from the speakers 43, thereby identifying the actual sound without the need for going to the measuring position. Further, when receiving the actual sound (digital signal), the PC 42 converts the digital signal into an analog signal, and outputs the actual sound (analog signal) to the MD recorder 16.

When the PC 42 receives the actual sound (digital signal) from the PC 40, the MD recorder 16 automatically starts recording the actual sound (analog signal) output from the PC 42 onto the MD. Like the first preferred embodiment, whether or not the actual sound is to be automatically recorded on the MD may be preliminarily set. Further, the recording of the actual sound may be manually started by the maintenance worker 4 as required.

As a modification, the actual sound (digital signal) transmitted from the PC 40 may be stored on a hard disk provided in the PC 42 or into an external storage. In this case, various data including the facility name of the specified noise detecting unit 1a, 1b, 1c, . . . and the date and time of measurement may be additionally stored, thereby facilitating subsequent data processing.

According to the third preferred embodiment, the maintenance worker 4 does not need to go to the measuring position where the specified noise detecting unit 1a, 1b, 1c, . . . is provided, and can immediately identify the actual sound as noise by using the PC 42. Further, the maintenance worker 4 can immediately examine countermeasures against the noise in the maintenance room 3. The noise detected can be recorded on the MD or stored on any storage device, and the actual sound as the noise thus recorded (or stored) can therefore be examined later by repeatedly reproducing the actual sound. Further, even when the maintenance worker 4 is absent in the maintenance room 3, there is no possibility of missing of the actual sound because it is recorded (or stored).

While the internet 41 is used as a network for transmitting the actual sound in the third preferred embodiment, any other network such as a LAN and a WAN may be used.

Further, while the radio network is used as a network for transmitting the noise level from each noise detecting unit 1a, 1b, 1c, . . . to the noise monitoring unit 2 in each of the first to third preferred embodiments, any other network such as a cable network, combined radio and cable communication network, LAN, WAN, and internet may be used.

In each of the first to third preferred embodiments, the MD recorder 16 may be replaced by a tape recorder to record the actual sound on a recording tape. Further, any recording device capable of recording an analog signal on a recording medium may be used to record the actual sound.

According to the present invention as described above, when the noise level becomes higher than the regulation standard, the actual sound (noise) can be transmitted. Accordingly, the maintenance worker need not go to the measuring position, and can hear the actual sound in the maintenance room, so that the maintenance worker can immediately identify the actual sound as noise. Further, the maintenance worker can immediately examine countermeasures against the noise in the maintenance room.

The actual sound as noise can be recorded, so that it can be examined later by repeatedly reproducing the actual sound. Further, even when the maintenance worker is absent in the maintenance room, there is no possibility of missing of the actual sound because it is recorded.

In addition, device for transmitting the actual sound as the noise can be configured by using commercially available inexpensive parts, so that the noise monitoring system can be easily configured at a low cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A noise monitoring system comprising:
   at least one noise detecting unit;
   a noise monitoring unit adapted to communicate with said noise detecting unit;
   said noise detecting unit comprising:
      measuring means for measuring a noise level of an actual sound;
      noise level transmitting means for transmitting the noise level measured by said measuring means to said noise monitoring unit; and
      actual sound transmitting means for transmitting said actual sound to said noise monitoring unit according to a request from said noise monitoring unit;
   said noise monitoring unit comprising:
      determining means for analyzing the noise level transmitted by said noise level transmitting means of said noise detecting unit and determining whether or not said noise level is higher than a regulation standard;
      means for requesting said noise detecting unit to transmit said actual sound when said determining means determines that said noise level is higher than said regulation standard; and
      sound generating means for generating said actual sound transmitted by said actual sound transmitting means of said noise detecting unit.

2. The noise monitoring system according to claim 1, wherein said noise monitoring unit further includes recording means for recording said actual sound transmitted by said actual sound transmitting means of said noise detecting unit.

3. The noise monitoring system according to claim 1, wherein said noise detecting unit further includes a backup power supply.

4. The noise monitoring system according to claim 2, wherein said noise detecting unit further includes a backup power supply.

5. The noise monitoring system according to claim 1, wherein said noise detecting unit is portable for selectively moving said noise detecting unit to a given area.

6. The noise monitoring system according to claim 2, wherein said noise detecting unit is portable for selectively moving said noise detecting unit to a given area.

7. The noise monitoring system according to claim 3, wherein said noise detecting unit is portable for selectively moving said noise detecting unit to a given area.

8. The noise monitoring system according to claim 1, wherein said noise level transmitting means is a radio for supplying said noise monitoring unit with the noise level measured by the measuring means.

9. The noise monitoring system according to claim 1, wherein said actual sound transmitting means is a telephone that is automatically answered by a calling party for permitting an individual to hear the actual noise supplied to the noise detecting unit.

10. The noise monitoring system according to claim 1, wherein said determining means is a computer for receiving said noise level transmitted by the noise level transmitting means and comparing the noise to a noise level regulation standard.

11. The noise monitoring system according to claim 1, wherein said actual sound transmitting means is an internet connection that automatically forwards the noise for permitting an individual to hear the actual noise supplied to the noise detecting unit.

12. A noise monitoring system comprising:
   at least one noise detecting unit;
   a noise monitoring unit adapted to communicate with said noise detecting unit;
   said noise detecting unit comprising:
      measuring means for measuring a noise level of an actual sound;
      noise level transmitting means for transmitting the noise level measured by said measuring means to said noise monitoring unit; and
      actual sound transmitting means for transmitting said actual sound according to a request from said noise monitoring unit;
   said noise monitoring unit comprising:
      determining means for analyzing the noise level transmitted by said noise level transmitting means of said noise detecting unit and determining whether or not said noise level is higher than a regulation standard; and
      information sending means for sending at least information that said noise level is higher than said regulation standard and information on said noise detecting unit that has detected said noise level higher than said regulation standard when said determining means determines that said noise level is higher than said regulation standard;
   said noise monitoring system further comprising:
      means for requesting said noise detecting unit to transmit said actual sound;
      sound generating means for generating said actual sound transmitted by said actual sound transmitting means of said noise detecting unit; and
      recording means for recording said actual sound transmitted by said actual sound transmitting means of said noise detecting unit.

13. The noise monitoring system according to claim 12, wherein said noise detecting unit further includes a backup power supply.

14. The noise monitoring system according to claim 12, wherein said noise detecting unit is portable for selectively moving said noise detecting unit to a given area.

15. The noise monitoring system according to claim 14, wherein said noise detecting unit is portable for selectively moving said noise detecting unit to a given area.

16. The noise monitoring system according to claim 12, wherein said noise level transmitting means is a radio for supplying said noise monitoring unit with the noise level measured by the measuring means.

17. The noise monitoring system according to claim 12, wherein said actual sound transmitting means is a telephone that is automatically answered by a calling party for permitting an individual to hear the actual noise supplied to the noise detecting unit.

18. The noise monitoring system according to claim 12, wherein said determining means is a computer for receiving said noise level transmitted by the noise level transmitting means and comparing the noise to a noise level regulation standard.

19. The noise monitoring system according to claim 12, wherein said actual sound transmitting means is an internet connection that automatically forwards the noise for permitting an individual to hear the actual noise supplied to the noise detecting unit.

* * * * *